(12) United States Patent
Hiraguchi

(10) Patent No.: US 9,336,822 B2
(45) Date of Patent: May 10, 2016

(54) RECORDING TAPE CARTRIDGE AND BRAKE MEMBER PROVIDED THERETO

(71) Applicant: FUJIFILM CORPORATION, Minato-ku, Tokyo (JP)

(72) Inventor: Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 104 days.

(21) Appl. No.: 14/307,502

(22) Filed: Jun. 18, 2014

(65) Prior Publication Data

US 2014/0374525 A1    Dec. 25, 2014

(30) Foreign Application Priority Data

Jun. 19, 2013    (JP) ................................. 2013-128962

(51) Int. Cl.
   *G03B 23/02*  (2006.01)
   *G11B 23/04*  (2006.01)
   *G11B 23/113*  (2006.01)

(52) U.S. Cl.
   CPC ............ *G11B 23/043* (2013.01); *G11B 23/113* (2013.01)

(58) Field of Classification Search
   CPC ...... G11B 23/00; G11B 23/043; G11B 23/26; G11B 23/107
   USPC ........ 242/348, 348.2, 332.4, 338, 338.1, 343, 242/343.1, 343.2; 360/132
   See application file for complete search history.

(56) References Cited

U.S. PATENT DOCUMENTS

| | | | |
|---|---|---|---|
| 2,362,150 A | 11/1944 | Odin | |
| 5,027,249 A | 6/1991 | Johnson et al. | |
| 6,113,020 A * | 9/2000 | Nayak | G11B 15/32 242/338.1 |
| 6,154,342 A * | 11/2000 | Vanderheyden | G11B 23/08721 242/338.1 |
| 6,279,845 B1 | 8/2001 | Hemzacek et al. | |
| 6,452,747 B1 * | 9/2002 | Johnson | G11B 23/043 242/338.1 |
| 6,452,748 B1 * | 9/2002 | Shima | G11B 23/043 360/132 |
| 6,913,217 B2 * | 7/2005 | Ishihara | G11B 23/107 242/338.1 |

(Continued)

FOREIGN PATENT DOCUMENTS

| | | |
|---|---|---|
| JP | S62-186281 | 11/1987 |
| JP | H8-010901 | 3/1996 |

(Continued)

OTHER PUBLICATIONS

English language translation of the following: Office action dated May 19, 2015 from the Japanese Patent Office in a Japanese patent application corresponding to the instant patent application.

*Primary Examiner* — William A Rivera
(74) *Attorney, Agent, or Firm* — SOLARIS Intellectual Property Group, PLLC

(57) ABSTRACT

A recording tape cartridge of the present invention includes: a reel formed with an engagement portion on a bottom portion of a reel hub; a resin brake member moving toward and away from the bottom portion of the reel hub, and selectively adopting a rotation locked position and a rotation permitted position; a resin release member being capable of movement in a reel axial direction and rotating as a unit with the reel; and a projection portion that projects out in the reel axial direction from an axial center portion of either the brake member or the release member, that is formed with a housing portion housing a spherical member that contacts the other out of the brake member or the release member, and that is formed with a lip portion jutting out from an opening end portion of the housing portion toward a reel radial direction inner side.

8 Claims, 11 Drawing Sheets

(56) References Cited

U.S. PATENT DOCUMENTS

| | | | |
|---|---|---|---|
| 7,021,578 B2 * | 4/2006 | Hiraguchi | G11B 23/107 242/338.1 |
| 7,066,421 B2 * | 6/2006 | Ishikawa | G11B 23/107 242/338.1 |
| 7,124,973 B2 * | 10/2006 | Hiraguchi | G11B 23/044 242/338.1 |
| 7,191,970 B2 * | 3/2007 | Yamamoto | G11B 23/107 242/338.1 |
| 7,261,249 B2 * | 8/2007 | Hiraguchi | G11B 23/107 242/338.1 |
| 2002/0085312 A1 | 7/2002 | Morita | |
| 2003/0123187 A1 | 7/2003 | Morita | |
| 2003/0123188 A1 | 7/2003 | Morita | |
| 2003/0128468 A1 | 7/2003 | Morita | |
| 2003/0142441 A1 | 7/2003 | Morita | |
| 2005/0063094 A1 | 3/2005 | Morita | |

FOREIGN PATENT DOCUMENTS

| | | |
|---|---|---|
| JP | H11-185437 | 7/1999 |
| JP | 2000-339911 A | 12/2000 |

* cited by examiner

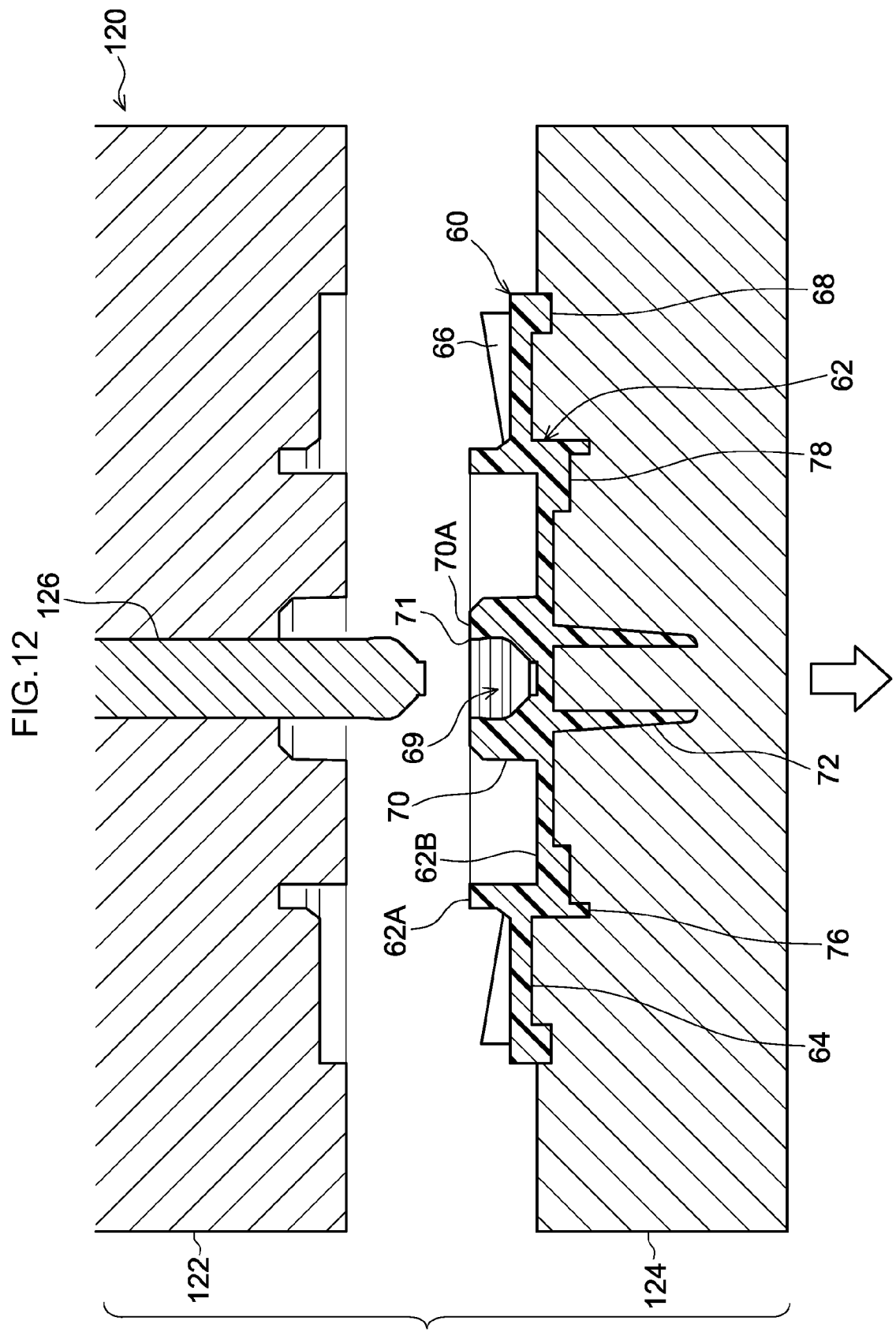

RECORDING TAPE CARTRIDGE AND BRAKE MEMBER PROVIDED THERETO

CROSS-REFERENCE TO RELATED APPLICATION

This application claims priority under 35 USC 119 from Japanese Patent Application No. 2013-128962 filed Jun. 19, 2013, the disclosure of which is incorporated by reference herein.

BACKGROUND

1. Technical Field

The present invention relates to a recording tape cartridge in which a case internally houses a single reel, onto which is wound a recording and reproduction medium, such as a magnetic tape, principally employed by a computer or the like, and to a brake member that is provided at the recording tape cartridge.

2. Related Art

Recording tape cartridges in which a case internally houses a single reel, onto which is wound a recording tape such as a magnetic tape, are provided with a resin brake member that engages with the reel to prevent rotation of the reel inside the case when not in use. When in use, a resin release member lifts up the brake member to release the engagement between the brake member and the reel.

Specifically, the release member rotates together with the reel, making sliding contact with the brake member. Technology is known in which, in order to reduce wear due to friction at the sliding contact location, a steel ball is rotatably provided at the brake member such that the steel ball makes sliding contact with the release member (see for example Japanese Patent Application Laid-Open (JP-A) No. 2000-339911). Technology is also known in which a resin spherical body serving as a release member is provided at a drive device (see for example U.S. Pat. No. 6,279,845).

However, when a steel ball is rotatably provided at the brake member as described in JP-A No. 2000-339911, there is a concern of wear accompanying rotation of the steel ball at locations where the brake member retains the steel ball, as well as a concern regarding losing the ability to retain the steel ball with good precision accompanying increase in the number of times the recording tape cartridge is used.

Moreover, in the technology described in JP-A No. 2000-339911, there is an issue that the steel ball is not easy to install since a base bottom wall extending in the reel radial direction has to be resiliently deformed toward the radial direction outer side when fitting the steel ball into a socket portion of the brake member. There is moreover a concern of a rib that is formed at the socket portion to prevent the steel ball from falling out being damaged or plastically deformed in this fitting operation.

When the rib formed at the socket portion suffers damage or plastic deformation, the retention force of the socket portion with respect to the steel ball decreases, leading to concerns of displacement of the retention position of the steel ball. Namely, there is a concern of the socket portion losing the ability to retain the steel ball with good precision. There are similar concerns on the release member side in U.S. Pat. No. 6,279,845.

SUMMARY

The present invention provides a recording tape cartridge provided with a brake member or a release member to which a spherical member can be easily installed, and also retained with good precision. The present invention also provides a brake member for providing to such a recording tape cartridge.

A recording tape cartridge according to a first aspect of the present invention includes: a reel that is housed inside a case, and that is formed with an engagement portion on a bottom portion of a bottomed circular cylinder shaped reel hub onto which a recording tape is wound; a resin brake member that is non-rotatably provided inside the case, that moves toward and away from the bottom portion of the reel hub, and that selectively adopts a rotation locked position where the brake member engages with the engagement portion, and a rotation permitted position where the engaged state with the engagement portion is released; a resin release member that is provided at the bottom portion of the reel hub so as to be capable of movement in a reel axial direction and so as to rotate as a unit with the reel, and that is capable of moving the brake member to the rotation permitted position; and a projection portion that is provided projecting out in the reel axial direction from an axial center portion of either the brake member or the release member, that is formed with a housing portion housing a spherical member that contacts the other out of the brake member or the release member, and that is formed with a lip portion jutting out from an opening end portion of the housing portion toward a reel radial direction inner side so as to retain the spherical member housed in the housing portion.

According to the first aspect of the invention, the projection portion that is provided projecting out in the reel axial direction from the axial center portion of either the brake member or the release member is formed with the housing portion housing the spherical member that contacts the other out of the brake member and the release member, and is formed with the lip portion jutting out from the opening end portion of the housing portion toward the reel radial direction inner side so as to retain the spherical member housed in the housing portion.

Note that the spherical member is installed by fitting into the housing portion (by the lip portion overriding the spherical member). Since the projection portion formed at the housing portion is provided projecting out in the reel axial direction, the housing portion readily undergoes resilient deformation toward the reel radial direction outer side. The spherical member can accordingly be easily installed, and the lip portion is not prone to damage or plastic deformation. Since the spherical member is retained, there is no concern of wear to locations of the brake member or the release member that retain the spherical member. The spherical member can accordingly be retained with good precision in the brake member, or the release member.

A recording tape cartridge according to a second aspect of the present invention is the recording tape cartridge of the first aspect, wherein: the housing portion includes an inner wall that increases in internal dimension on progression toward an opening end portion side of the housing portion; and the spherical member is housed by the inner wall and the lip portion.

According to the second aspect of the invention, the spherical member is housed by the inner wall and the lip portion of the housing portion. The spherical member can accordingly be non-rotatably retained with better precision, than in a configuration in which the spherical member is not housed by the inner wall and the lip portion of the housing portion.

A recording tape cartridge according to a third aspect of the present invention is the recording tape cartridge of the first aspect, wherein: a projection height of the projection portion is higher than, or the same as, a height of the portion of the spherical member that is exposed from the opening end portion of the housing portion subtracted from the diameter of the spherical member.

According to the third aspect of the invention, the projection height of the projection portion is higher than, or the same as, the height of the portion of the spherical member that is exposed from the opening end portion of the housing portion subtracted from the diameter of the spherical member. Namely, the spherical member does not project out toward a main body of the brake member or a main body of the release member. The main body of the brake member or the main body of the release member is therefore not affected by resilient deformation of the projection portion toward the radial direction outer side, maintaining a high degree of precision in the brake member or the release member.

A recording tape cartridge according to a fourth aspect of the present invention is the recording tape cartridge of the first aspect, wherein: a projection height of the projection portion is lower than the diameter of the spherical member; and a height of one end portion of the spherical member that is exposed from the opening end portion of the housing portion is higher than a height of another end portion of the spherical member that projects out from an opening formed on the opposite side of the housing portion to the opening end portion.

According to the fourth aspect of the invention, the projection height of the projection portion is lower than the diameter of the spherical member, and the height of the one end portion of the spherical member that is exposed from the opening end of the housing portion is higher than the height of the other end portion of the spherical member that projects out from the opening formed on the opposite side of the housing portion to the opening end portion. The spherical member is therefore prevented from coming out from the brake member or the release member even when external force is applied to the spherical member in the reel axial direction.

A recording tape cartridge according to a fifth aspect of the present invention is the recording tape cartridge of the first aspect, wherein: a projection height of the projection portion is lower than the diameter of the spherical member; and a height of one end portion of the spherical member that is exposed from the opening end portion of the housing portion is lower than a height of another end portion of the spherical member that projects out from an opening formed on the opposite side of the housing portion to the opening end portion, and a cover that covers at least a portion of the other end portion of the spherical member is formed at the opposite side to the opening end portion.

According to the fifth aspect of the invention, the projection height of the projection portion is lower than the diameter of the spherical member, and the height of the one end portion of the spherical member that is exposed from the opening end portion of the housing portion is lower than the height of the other end portion of the spherical member that projects out from the opening formed on the opposite side of the housing portion to the opening end portion, and the cover that covers at least a portion of the other end portion of the spherical member is formed at the opposite side to the opening end portion. The cover accordingly prevents the spherical member from coming out from the brake member or the release member even when external force is applied to the spherical member in the reel axial direction.

A recording tape cartridge according to a sixth aspect of the present invention is the recording tape cartridge of the first aspect, wherein the projection portion is provided projecting from the brake member.

According to the sixth aspect of the invention, the projection portion that non-rotatably retains the spherical member is provided projecting from the brake member that is non-rotatable with respect to the case, thereby enabling a contribution to be made to increasing the reel rotation speed in comparison to a case in which the projection portion is provided projecting from the release member that rotates as a unit with the reel.

A recording tape cartridge according to a seventh aspect of the present invention is the recording tape cartridge of the sixth aspect, wherein the projection portion is provided projecting from a circular plate portion that is formed at the brake member so as to extend in the reel radial direction.

According to the seventh aspect of the invention, the projection portion is provided projecting from the circular plate portion that is formed at the brake member so as to extend in the reel radial direction. Accordingly, resilient deformation of the projection portion toward the radial direction outer side is not hindered when fitting the spherical member into the housing portion, enabling excellent resilient deformation of the projection portion toward the radial direction outer side.

A brake member for providing to a recording tape cartridge according to an eighth aspect of the present invention includes: a circular plate portion that extends in a radial direction of a reel; a projection portion that is provided projecting in a reel axial direction from an axial center portion of the circular plate portion; a spherical member that is housed in a partially exposed state in a housing portion formed at the projection portion; and a lip portion that is formed jutting out toward a reel radial direction inner side from an opening end portion of the housing portion of the projection portion, and that retains the spherical member housed in the housing portion.

According to the eighth aspect of the invention, a brake member is obtained that can be easily installed with the spherical member, and that can retain the spherical member with good precision.

BRIEF DESCRIPTION OF THE DRAWINGS

Exemplary Embodiments of the present invention will be described in detail with reference to the following figures, wherein:

FIG. 12 is a cross-section to explain operation during separation of a brake member of a recording tape cartridge according to the present exemplary embodiment and a mold core.

DETAILED DESCRIPTION

Figure 1A:
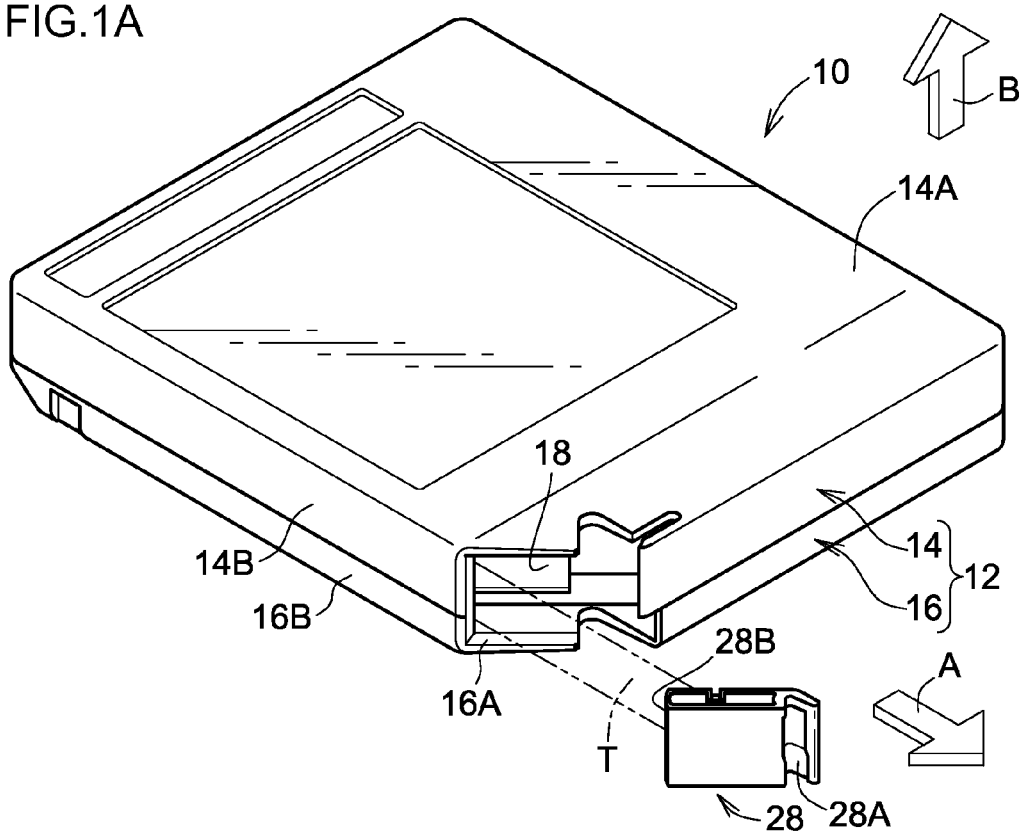
FIG. 1A is a perspective view illustrating a recording tape cartridge according to a present exemplary embodiment, as viewed from above.

Detailed explanation follows regarding an exemplary embodiment of the present invention, with reference to the drawings. Note that for ease of explanation, a direction in which a recording tape cartridge 10 is loaded into a drive device, indicated by the arrow A, is taken as the recording tape cartridge 10 front direction (front side). A direction orthogonal to the arrow A direction, indicated by the arrow B, is taken as the recording tape cartridge 10 upward direction (upper side). Moreover, in the following explanation, the radial direction and the axial direction of a reel 30 are sometimes referred to simply as the "radial direction" and the "axial direction".

As illustrated in FIG. 1A to FIG. 3, the recording tape cartridge 10 includes a case 12 configured by a resin upper case 14 and a resin lower case 16. The upper case 14 includes a top plate 14A that is substantially rectangular shaped in plan view, and peripheral walls 14B that are provided standing out along peripheral edges of the top plate 14A in a substantially frame shape. The lower case 16 includes a bottom plate 16A that corresponds with the top plate 14A and is substantially rectangular shaped in plan view, and peripheral walls 16B that are provided standing out along peripheral edges of the bottom plate 16A in a substantially frame shape.

The case 12 thus forms a substantially rectangular box shape in a state in which opening ends of the peripheral walls 14B and opening ends of the peripheral walls 16B are abutted against each other, and the upper case 14 and the lower case 16 are joined together using, for example, ultrasonic welding or screw fastening. One (a right side) corner portion on the front side of the case 12 is diagonally notched in plan view, with an opening 18 formed at this location.

Moreover, a substantially central portion of the bottom plate 16A of the lower case 16 is formed with a circular shaped gear opening 20 that exposes a reel gear 42 and a reel plate 54, described later. A ring shaped rib 22 projects out upwards from an edge portion of the gear opening 20 of the bottom plate 16A. The ring shaped rib 22 is used to position and also to keep dirt out of the reel 30.

A pair of positioning holes 24, 26, into which are inserted positioning pins provided at a drive device, not illustrated in the drawings, are formed in the vicinity of a front end of an outer face of the bottom plate 16A. Smooth positioning faces 24A, 26A are configured at the peripheries of the respective positioning holes 24, 26. The recording tape cartridge 10 can accordingly be positioned in both the horizontal direction (left-right/front-rear) and the vertical direction (up-down) inside the drive device.

A single resin reel 30, described later, is rotatably housed inside the case 12. A recording tape T such as a magnetic tape is wound onto the reel 30. A leader block 28 serving as a leader member is attached to a free end of the recording tape T. When the recording tape cartridge 10 is not in use, the leader block 28 is housed retained in the case 12 so as to close off the opening 18, thereby suppressing or preventing the ingress of dirt, dust and the like inside the case 12.

A leading end of the leader block 28 is formed with an engagement recess 28A. The engagement recess 28A engages with a pulling out member inside the drive device to pull the leader block 28 out of the case 12, thereby pulling the recording tape T out from inside the case 12. Note that the leader block 28 is configured so as to fit into a reel hub of a winding reel inside the drive device, and an end face on the opposite side to the engagement recess 28A configures a circular arc face 28B configuring a portion of an outer peripheral face of the reel hub.

Figure 2:
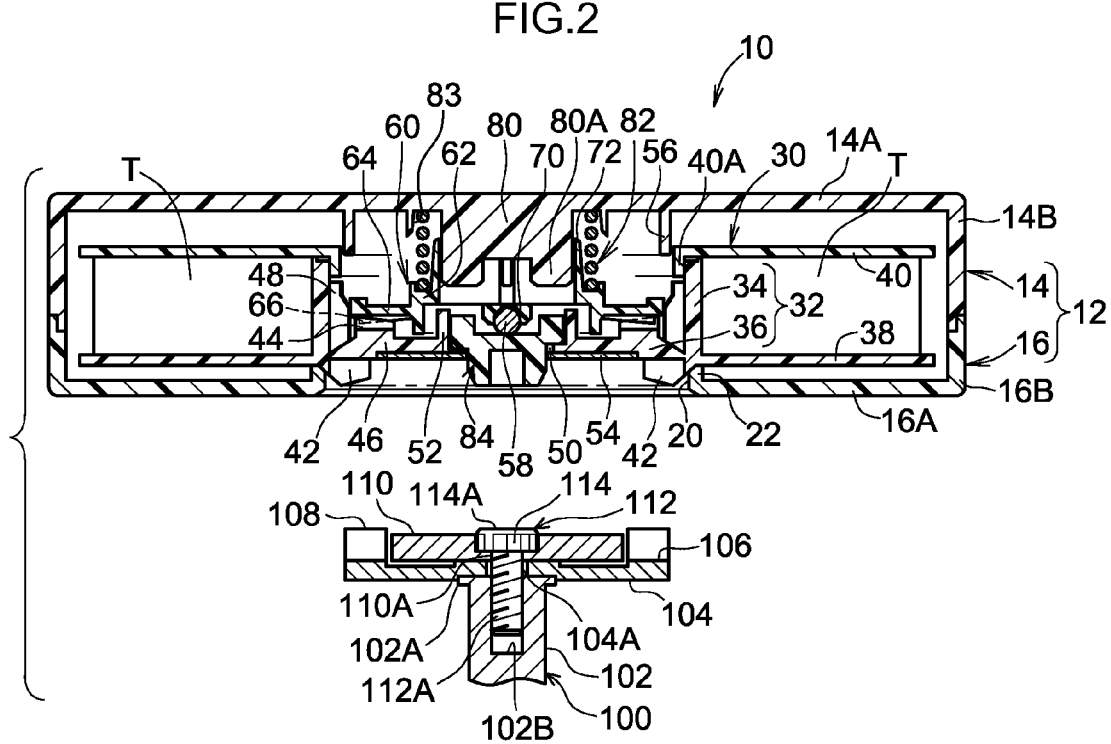
FIG. 2 is a side cross-section illustrating a reel of a recording tape cartridge according to the present exemplary embodiment in a rotation locked position.
Figure 3:
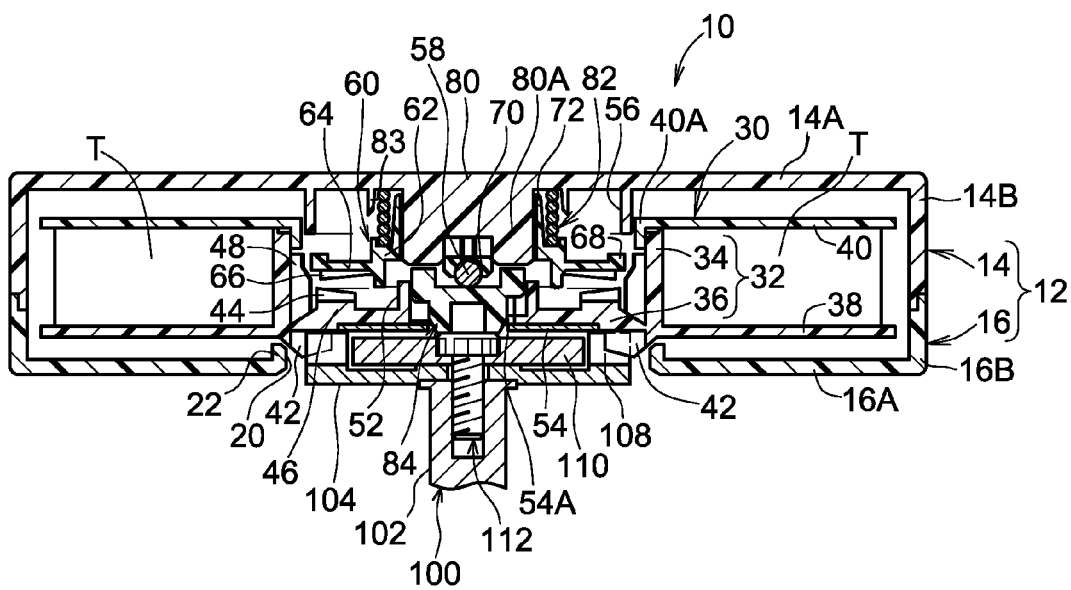
FIG. 3 is a side cross-section illustrating a reel of a recording tape cartridge according to the present exemplary embodiment in a rotation permitted position.
Figure 4:
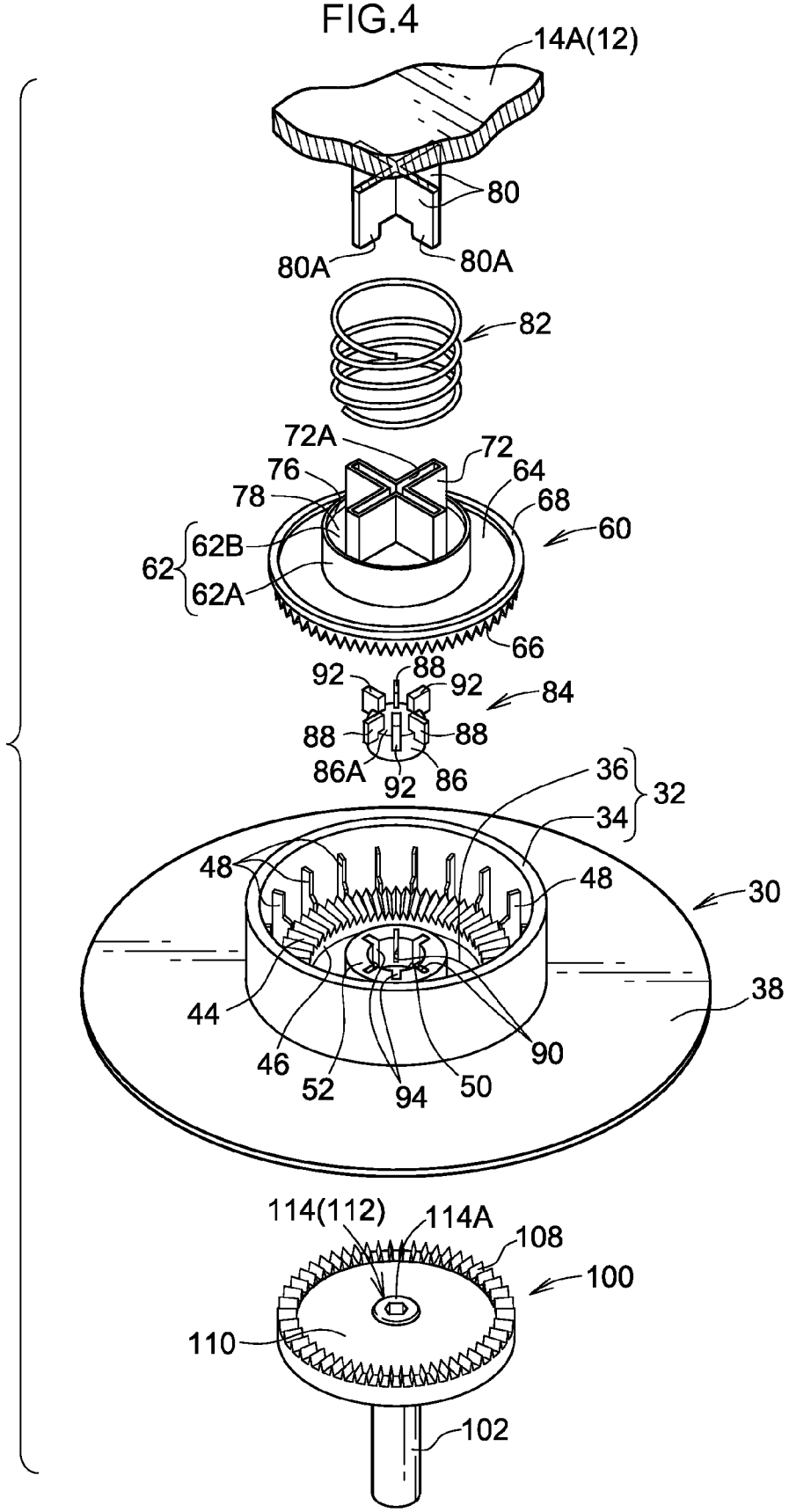
FIG. 4 is an exploded perspective view illustrating a brake member and a clutch member of a recording tape cartridge according to the present exemplary embodiment, as viewed from above.

As illustrated in FIG. 2 to FIG. 4, the reel 30 is provided with a reel hub 32 configuring an axial center portion of the reel 30. The reel hub 32 is formed in a bottomed circular cylinder shape and includes a circular cylinder portion 34, onto an outer periphery of which the recording tape T is wound, and a bottom portion 36 that closes off a lower portion of the circular cylinder portion 34. A lower flange 38 is coaxially and integrally provided at a bottom portion 36 side end portion (lower end portion) of the reel hub 32 (circular cylinder portion 34) so as to extend toward the radial direction outer side.

A resin ring shaped upper flange 40 (omitted in FIG. 4) is joined to an upper end portion of the reel hub 32 (circular cylinder portion 34). The upper flange 40 has the same external diameter as the external diameter of the lower flange 38. An axial center portion of the upper flange 40 is formed with a short tube portion 40A with an external diameter corresponding to the internal diameter of the circular cylinder portion 34. The upper flange 40 is welded coaxially to the reel hub 32 with the short tube portion 40A in a fitted state inside the upper end portion of the circular cylinder portion 34. The reel hub 32 thus opens facing upwards.

The reel 30 takes up the recording tape T onto an outer peripheral face of the circular cylinder portion 34 of the reel hub 32 between opposing faces of the lower flange 38 and the upper flange 40. Moreover, the ring shaped reel gear 42 is formed coaxially to the reel 30 at a lower face (outer face) side of the bottom portion 36 of the reel hub 32 (see FIG. 1B). The reel gear 42 is capable of enmeshing with a drive gear 108 that is provided at a rotation shaft 100 of the drive device, described later.

An upper face (inner face) side of the bottom portion 36 of the reel hub 32 is formed with a ring shaped engagement gear 44 that is coaxial to the reel 30 and that serves as an engagement portion. The engagement gear 44 is formed on a ring shaped raised seat 46 that stands out slightly from the inner face of the bottom portion 36. The engagement gear 44 is capable of enmeshing with a brake gear 66 of a brake member 60, described later.

At the radial direction outer side of the engagement gear 44 (raised seat 46), plural upright ribs 48 that run contiguously over the inner peripheral face of the circular cylinder portion 34 and the upper face of the bottom portion 36 are provided extending along the reel 30 axial direction at even intervals around the circumferential direction. Due to the upright ribs

48, the engagement gear 44 is formed further toward the radial direction inner side than the reel gear 42. Note that the upright ribs 48 will be described later together with the brake member 60.

The axial center portion of the bottom portion 36 of the reel hub 32 is further formed with a circular shaped through hole 50. A short circular cylinder shaped clutch boss 52 serving as a guide wall portion projects upwards from the upper face of the bottom portion 36 around an edge portion of the through hole 50. The clutch boss 52 will be described later together with a clutch member 84.

Figure 1B:
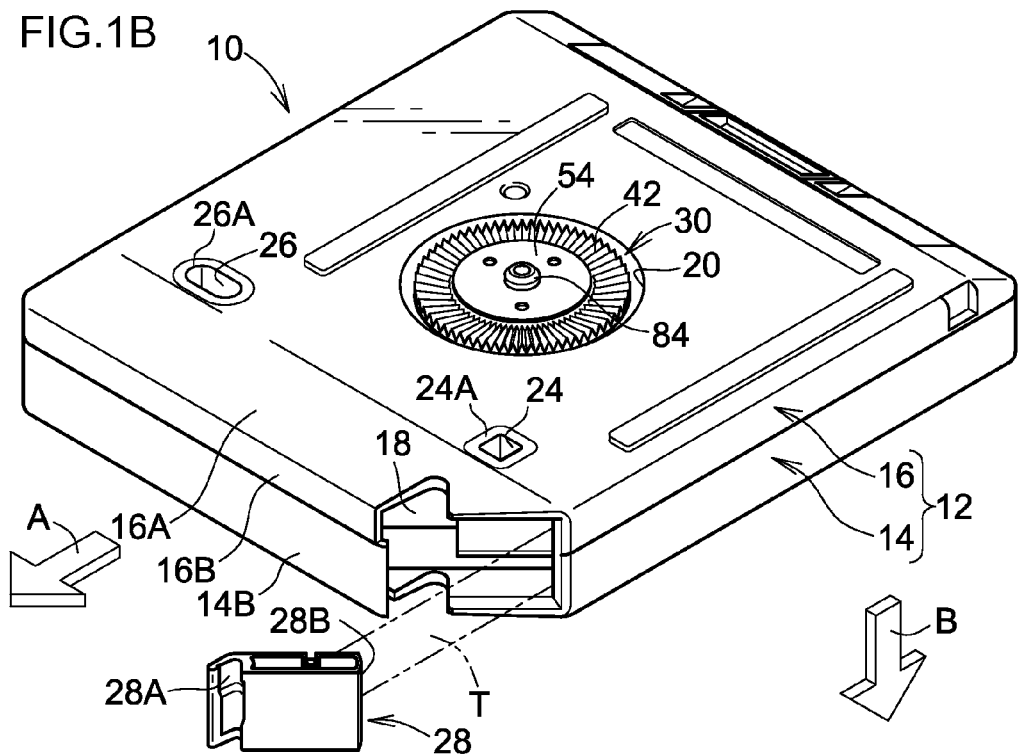
FIG. 1B is a perspective view illustrating a recording tape cartridge according to the present exemplary embodiment, as viewed from below.

The reel plate 54, that has a flat plate ring shape and is formed by insert molding a magnetic material, is provided coaxially and integrally to the reel hub 32 at the radial direction inner side of the reel gear 42 at the lower face of the bottom portion 36 of the reel hub 32 (see FIG. 1B). A circular shaped hole 54A is formed at an axial center portion of the reel plate 54. The internal diameter of the hole 54A is slightly smaller than the internal diameter of the through hole 50 (see FIG. 6).

When not in use, the reel 30 is biased downwards by a compression coil spring 82, described later, and sits on the ring shaped rib 22. Radial direction movement of the reel 30 (rattling inside the case 12) is thereby suppressed or prevented, and ingress of dirt, dust, and the like through the gear opening 20 is suppressed or prevented.

The reel gear 42 and the reel plate 54 are exposed to the case 12 outer side through the gear opening 20, and a clutch member 84, described later, faces the gear opening 20 through the hole 54A of the reel plate 54. Chucking (retention) and rotation drive of the reel 30 from outside the case 12 is thus enabled.

Moreover, as illustrated in FIG. 2 and FIG. 3, a ring shaped restriction rib 56 that projects out from the top plate 14A is inserted in a non-contact state at an inner peripheral face side of the short tube portion 40A of the upper flange 40. Namely, an outer peripheral face of the restriction rib 56 is disposed in close proximity to the inner peripheral face of the short tube portion 40A of the upper flange 40, such that rattling of the reel 30 inside the case 12 is further suppressed or prevented.

Figure 5:
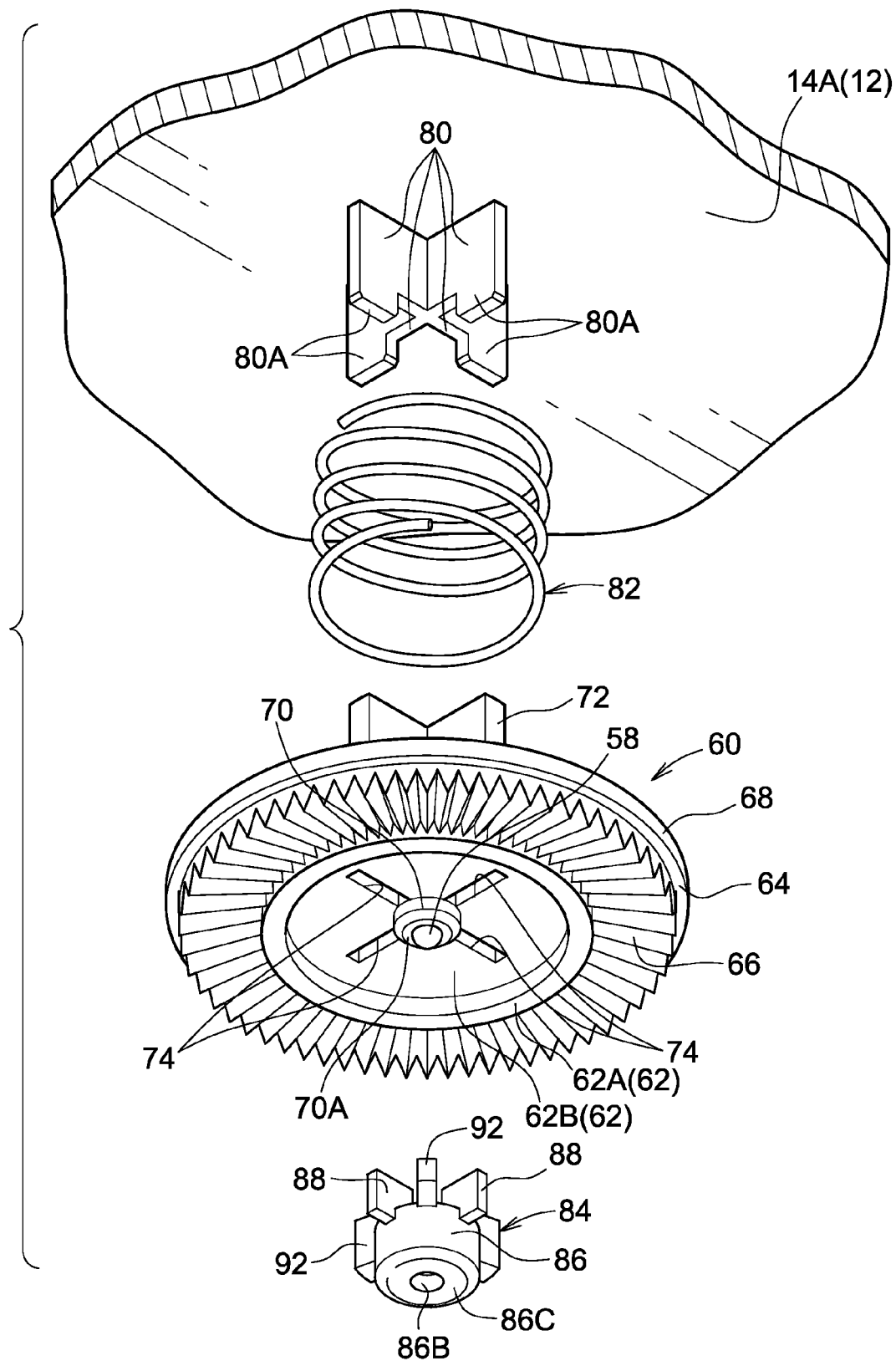
FIG. 5 is an exploded perspective view illustrating a brake member and a clutch member of a recording tape cartridge according to the present exemplary embodiment, as viewed from below.

The recording tape cartridge 10 is provided with the brake member 60, that is made from a resin (for example polyacetal) and serves as a brake member that prevents rotation of the reel 30 when not in use. As illustrated in FIG. 4 and FIG. 5, the brake member 60 includes a base 62 serving as a main body portion. The base 62 is formed in a bottomed, downward opening substantially circular cylinder shape by a cylinder portion 62A formed in a short circular cylinder shape, and a circular plate portion 62B that closes off an upper end of the cylinder portion 62A.

The external diameter of the cylinder portion 62A is formed smaller than the internal diameter of the engagement gear 44 (raised seat 46), and the internal diameter of the cylinder portion 62A is formed larger than the external diameter of the clutch boss 52 (see FIG. 2 and FIG. 3). A substantially flat plate shaped ring portion 64 is integrally formed encircling the entire circumference of an axial direction intermediate portion of an outer peripheral face of the base 62 (cylinder portion 62A).

The brake gear 66 that is capable of enmeshing with the engagement gear 44 is integrally formed around the entire circumference of a lower face of the ring portion 64. A ring shaped reinforcement rib 68 projects out along an outer edge portion of an upper face of the ring portion 64, thereby securing the rigidity of the ring portion 64 (brake gear 66).

As illustrated in FIG. 2, FIG. 3, FIG. 5 and FIG. 6, a circular column shaped projection portion 70 projects out in the reel 30 axial direction from an axial center portion of a lower face of the circular plate portion 62B of the base 62. Moreover, as illustrated in FIG. 7, an axial center portion of the projection portion 70 is formed with a cavity shaped housing portion 69 that exposes a portion of a steel ball 58, serving as a spherical member, from a leading end portion 70A, and that houses and retains the remaining portion of the steel ball 58.

An opening (leading end portion 70A) side of the housing portion 69 configures a substantially circular column shaped space S2, and a bottom portion side on the opposite side to the opening side configures a circular truncated cone shaped space S1 that is contiguous to the space S2. An inner wall of the housing portion 69 that configures the space S1 configures an inclined wall 69A with an internal dimension that decreases on progression toward the bottom portion side (an internal dimension that increases on progression toward the leading end portion 70A side).

An inner wall of the housing portion 69 that configures the space S2 is configured by a tapering wall 69B that is contiguous to the inclined wall 69A and that has a smaller angle of inclination with respect to the projection portion 70 axial direction than the inclined wall 69A, and a straight wall 69C that is contiguous to the tapering wall 69B and extends along the projection portion 70 axial direction. A lip portion 71 that is contiguous to the straight wall 69C and that juts out toward the reel 30 radial direction inner side is formed encircling the entire circumference of the housing portion 69 opening end portion (the leading end portion 70A).

The lip portion 71 is what is known as an undercut portion, and is formed so as to reduce the internal dimension of the housing portion 69 opening end portion, and has a specific thickness (height) in the reel 30 axial direction. The lip portion 71 is thus configured with a sufficient degree of rigidity to non-rotatably retain the steel ball 58 that is housed in the housing portion 69 together with the housing portion 69 (inclined wall 69A).

The steel ball 58 is formed from a metal such as stainless steel, and typical examples of such a stainless steel ball are stainless steel balls formed from SUS304 or SUS440C. The material for the steel ball 58 may also be, for example, a high carbon high chromium steel material (JIS G 4805 SUJ-2) or a cold-forged carbon steel (JIS G 3505 SWRCM10 or SWRCM12, or JIS G 4051SCK).

Such a steel ball 58 generally has a higher thermal conductivity than a resin material. Employing the steel ball 58 enables frictional heat generated when sliding against a resin member counterpart (the clutch member 84, described later) to readily diffuse, lowering the temperature of the contact point, and making the resin member counterpart (the clutch member 84) less liable to melting or deformation.

The housing portion 69 is slotted over (fitted over) the steel ball 58 from the opening end side (leading end portion 70A), thereby attaching the steel ball 58 inside the housing portion 69. Namely, the leading end portion 70A of the projection portion 70 formed with the lip portion 71 undergoes resilient deformation, widening toward the reel 30 radial direction outer side to take in the steel ball 58.

Figure 6:
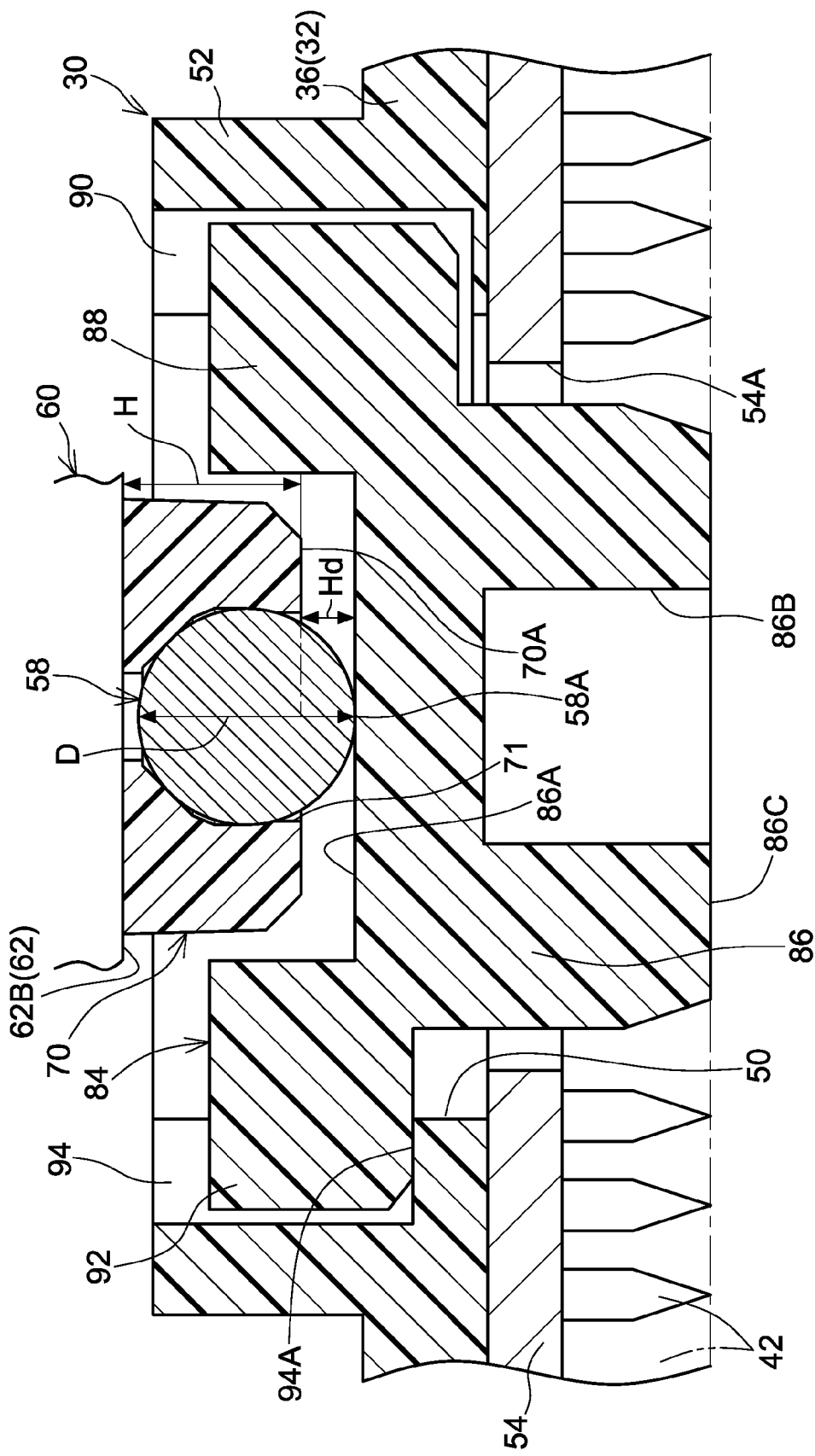
FIG. 6 is an enlarged side cross-section illustrating a sliding contact portion between a brake member and a clutch member of a recording tape cartridge according to the present exemplary embodiment.
Figure 7:
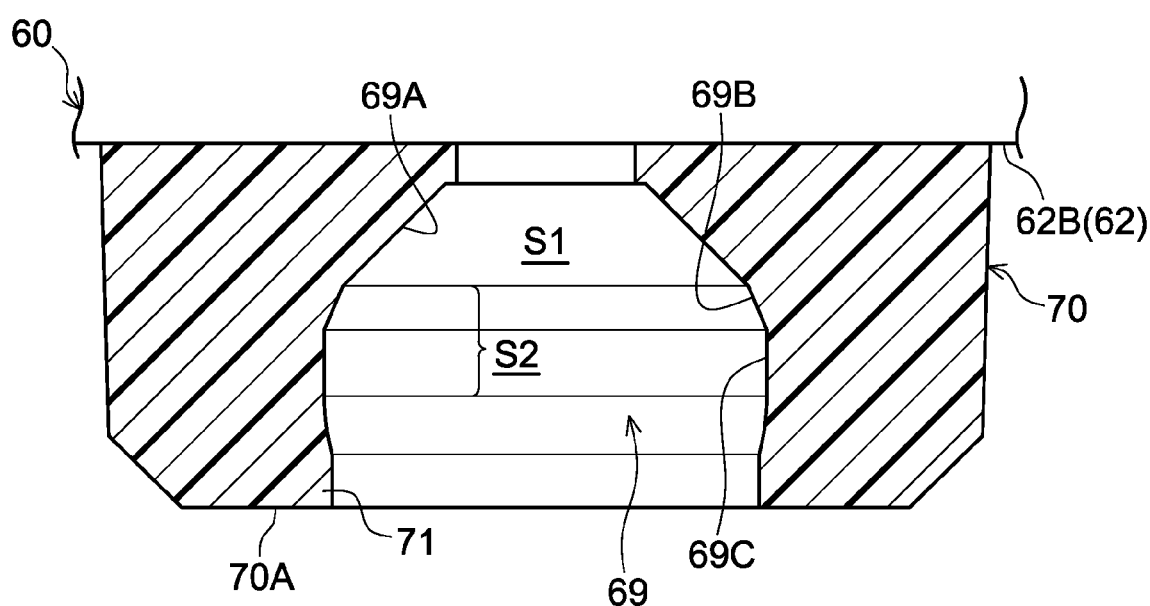
FIG. 7 is an enlarged cross-section illustrating a projection portion of a brake member of a recording tape cartridge according to the present exemplary embodiment.

As illustrated in FIG. 6, the steel ball 58 is gripped and fixed (housed) by the lip portion 71 that has recovered after resiliently deforming, and by the inclined wall 69A. Namely, the steel ball 58 is gripped and fixed in the fitting direction (the reel 30 axial direction), such that even when the reel 30 is drive rotated (in a sliding contact state with the clutch member 84), the steel ball 58 is non-rotatably retained and prevented from falling out of the housing portion 69 by the leading end portion 70A of the projection portion 70.

Note that the axial direction dimensions and shape of the housing portion 69 are appropriately set with respect to the steel ball 58 to enable the steel ball 58 to be gripped and fixed (so as to enable non-rotatable retention) by the lip portion 71 and the inclined wall 69A. A portion of the steel ball 58 is exposed to the exterior from the leading end portion 70A of the projection portion 70 (the opening end portion of the housing portion 69), with the portion of the steel ball 58 that is exposed to the outer side configuring a sliding contact portion 58A that is the point of contact with a sliding contact face 86A of the clutch member 84.

A projection height H of the projection portion 70 from the lower face of the circular plate portion 62B is set either higher than, or the same as, a height of a height Hd of the portion of the steel ball 58 that is externally exposed from the leading end portion 70A of the projection portion 70 (the opening end portion of the housing portion 69) subtracted from the diameter D of the steel ball 58. Accordingly, when the steel ball 58 is being fitted inside the housing portion 69, the base 62 (circular plate portion 62B) is not affected by resilient deformation even when the lip portion 71 (leading end portion 70A of the projection portion 70) resiliently deforms toward the reel 30 radial direction outer side.

Viewed from the side, a lower end face of the leading end portion 70A of the projection portion 70 is positioned in the same plane as, or slightly above (toward the cylinder portion 62A inside of) the lower face of the cylinder portion 62A (see FIG. 2, FIG. 3). The lower end face of the leading end portion 70A of the projection portion 70 is namely configured so as to not project out below the lower end face of the cylinder portion 62A as viewed from the side. A reduction in the rigidity of the projection portion 70 can accordingly be suppressed.

Moreover, as illustrated in FIG. 2 to FIG. 5, a cross shaped protrusion 72, that includes an insertion slit 72A and that is cross shaped in plan view, projects out from an upper face of the circular plate portion 62B. Four through holes 74 that are substantially rectangular shaped in plan view are formed in the circular plate portion 62B at the inside of the insertion slit 72A, excluding an axial center portion (intersection portion) of the circular plate portion 62B from which the projection portion 70 projects, so as to extend from the axial center portion in a radiating pattern.

A ring shaped rib 76 projects out integrally from an upper end outer peripheral portion of the base 62. An outer peripheral face of the rib 76 and an outer peripheral face of the cylinder portion 62A are integrated together with each other. An upper face of the circular plate portion 62B between the rib 76 and the cross shaped protrusion 72 configures a spring bearing face 78 that is contacted by one end portion of the compression coil spring 82, described later.

The brake member 60 configured as described above is inserted inside the circular cylinder portion 34 of the reel hub 32 so as to be capable of movement in the up-down direction (in the reel 30 axial direction). Namely, by moving in the up-down direction, the brake member 60 can selectively adopt a position where the brake gear 66 enmeshes with the engagement gear 44 of the reel hub 32 (rotation locked position), or a position in which the enmeshing is released (rotation permitted position).

A cross shaped rib 80 that projects downwards from the top plate 14A of the case 12 is inserted into the insertion slit 72A configured by the cross shaped protrusion 72 of the brake member 60. The cross shaped rib 80 is configured in the shape of two thin plates intersecting orthogonally with one another. Rotation of the brake member 60 with respect to the case 12 is prevented by engagement between the cross shaped rib 80 and the cross shaped protrusion 72 (slit walls of the insertion slit 72A).

Namely, the brake gear 66 of the brake member 60 that is prevented from rotating with respect to the case 12 is made to enmesh with the engagement gear 44 of the reel hub 32, thereby preventing rotation of the reel 30. Note that the cross shaped rib 80 maintains an inserted state inside the insertion slit 72A across the entire up-down direction movement stroke of the brake member 60, such that the cross shaped rib 80 also performs a guide function of guiding up-down direction movement of the brake member 60.

A lower end portion of the cross shaped rib 80 is formed with respective projection tabs 80A. The respective projection tabs 80A are formed so as to be capable of insertion inside the respective through holes 74 of the brake member 60. When the brake member 60 is positioned in the rotation locked position, the projection tabs 80A are positioned inside the insertion slit 72A (see FIG. 2). When the brake member 60 is positioned in a released position (rotation permitted position), the projection tabs 80A are inserted into the respective through holes 74 and project out from the lower face of the circular plate portion 62B (see FIG. 3).

A sufficient reel 30 axial direction engagement amount (insertion depth) is accordingly secured between the cross shaped rib 80 and the brake member 60, suppressing tilting of the brake member 60 with respect to the case 12, and improving guidance characteristics in the brake member 60 up-down direction.

Moreover, when the brake member 60 is positioned in the rotation locked position, radial direction movement of the brake member 60 is restricted by the upright ribs 48 of the reel 30. When the brake member 60 is positioned in the rotation permitted position, the brake member 60 does not impinge on the upright ribs 48 rotating together with the reel 30. Specifically, upper portion sides of the upright ribs 48 are notched such that the upright ribs 48 are in close proximity to the reinforcement rib 68 of the brake member 60 in the rotation locked position, and such that a separation between the upright ribs 48 and the reinforcement rib 68 of the brake member 60 is a specific value or greater in the rotation permitted position.

Moreover, the compression coil spring 82 that serves as a biasing member is disposed between the spring bearing face 78 of the brake member 60 and the top plate 14A. The one end portion of the compression coil spring 82 contacts the spring bearing face 78, and the other end portion of the compression coil spring 82 contacts the top plate 14A, with the other end portion disposed inside a ring shaped wall portion 83 that projects out from the top plate 14A at the radial direction outer side of the cross shaped rib 80. Radial direction positional displacement of the other end portion of the compression coil spring 82 is thereby suppressed or prevented.

The biasing force of the compression coil spring 82 biases the brake member 60 downwards, such that when the recording tape cartridge 10 is not in use, the brake gear 66 enmeshes with the engagement gear 44 (the brake member 60 is placed in the rotation locked position), thereby preventing unintentional rotation of the reel 30. The reel 30 is also biased downwards by the biasing force such that the reel 30 contacts the ring shaped rib 22.

The recording tape cartridge 10 is further provided with the clutch member 84 that is made from a resin (for example polyacetal) and that serves as a release member that is externally operated to release the locked state of the reel 30 by the brake member 60. As illustrated in FIG. 4 to FIG. 6, the clutch member 84 is disposed between the bottom portion 36 of the reel 30 and the brake member 60, and includes a clutch main body 86 that is formed in a substantially circular column shape and that serves as a main body portion.

The external diameter of the clutch main body 86 is slightly smaller than the internal diameter of the hole 54A of the reel plate 54, and when the recording tape cartridge 10 is not in use, the clutch main body 86 is inserted through the hole 54A in a state in which seat ribs 92 of the clutch main body 86 contact stopper grooves 94, described later, under the biasing force of the compression coil spring 82 acting through the brake member 60. A flattened upper end face of an axial center portion of the clutch main body 86 configures the sliding contact face 86A that is in constant contact with the sliding contact portion 58A of the steel ball 58 provided in the projection portion 70 of the brake member 60.

A thinning cavity 86B is formed at the center of a lower end portion of the clutch main body 86. A flattened lower end face at the periphery of the thinning cavity 86B configures a press operation face 86C. The press operation face 86C is pressed upwards (the clutch member 84 is moved upwards) by the rotation shaft 100, described later, thereby retaining the brake member 60 in the rotation permitted position against the biasing force of the compression coil spring 82.

The clutch member 84 is further provided with rotation restriction ribs 88 that jut out further toward the radial direction outer side than an outer peripheral face of the clutch main body 86. Plural (for example three) of the rotation restriction ribs 88 are provided at even intervals around the circumferential direction of the clutch main body 86, and the rotation restriction ribs 88 are disposed in a radiating pattern in plan view. Each of the rotation restriction ribs 88 projects out upwards and toward the radial direction outer side so as to straddle between (connect to both) an upper end face at the periphery of the sliding contact face 86A and the outer peripheral face of the clutch main body 86 in the vicinity of the upper end face.

The respective rotation restriction ribs 88 are inserted into recessed rotation restriction grooves 90 provided at an inner edge portion of the clutch boss 52. Three of the rotation restriction grooves 90 are provided opening upwards at even intervals around the circumferential direction of the clutch boss 52. The rotation restriction ribs 88 of the clutch member 84 are accordingly capable of up-down direction movement guided by the rotation restriction grooves 90 of the clutch boss 52.

The respective rotation restriction ribs 88 maintain an inserted state inside the rotation restriction grooves 90 of the clutch boss 52 even when the clutch member 84 is moved upwards to place the brake member 60 in the rotation permitted position. The clutch member 84 therefore rotates as a unit with the reel 30 at all times.

Bottom portions of the respective rotation restriction grooves 90 are closed off, such that the rotation restriction ribs 88 and the rotation restriction grooves 90 prevent the clutch member 84 from falling out of the reel hub 32. The seat ribs 92 are also provided separately to the rotation restriction ribs 88 to prevent the clutch member 84 from falling out of the reel hub 32.

Plural of the seat ribs 92 are provided at even intervals around the circumferential direction of the clutch main body 86, with for example three of the seat ribs 92 provided at circumferential direction intermediate portions between the respective rotation restriction ribs 88. The respective seat ribs 92 are, similarly to the rotation restriction ribs 88, disposed in a radial pattern in plan view and project out upwards and toward the radial direction outer side so as to straddle between the upper end face at the periphery of the sliding contact face 86A of the clutch main body 86, and the outer peripheral face in the vicinity of the upper end face.

The respective seat ribs 92 are inserted into the recessed stopper grooves 94 provided at the inner edge portion of the clutch boss 52. The respective stopper grooves 94 are provided at even intervals around the clutch boss 52 circumferential direction at circumferential direction intermediate portions between the respective rotation restriction grooves 90. The stopper grooves 94 open upwards, with upper faces of closed off bottom portions thereof configuring stopper faces 94A.

Accordingly, lower end faces the respective seat ribs 92 contact (are seated on) the respective stopper faces 94A when the brake member 60 is in the rotation locked position. Note that upper end faces of the respective rotation restriction ribs 88 and seat ribs 92 are set at the same height as each other, however lower end faces of the rotation restriction ribs 88 are positioned further toward the lower side than the lower end faces of the seat ribs 92.

Namely, upper ends of the respective rotation restriction grooves 90 and stopper grooves 94 are aligned with each other, however the bottom faces of the rotation restriction grooves 90 are positioned further toward the lower side than the stopper faces 94A of the stopper grooves 94. In other words, the rotation restriction ribs 88 are formed longer in the up-down direction than the seat ribs 92, and the rotation restriction grooves 90 are formed deeper in the up-down direction than the stopper grooves 94.

This configuration is adopted since increasing an engageable amount between the rotation restriction ribs 88 and the clutch boss 52 (an insertable amount into the rotation restriction grooves 90), enables stress received from the reel 30 during rotation of the reel 30 to be alleviated, as well as improving guidance characteristics during up-down movement of the clutch member 84. Rattling of the clutch member 84 can also be suppressed even when the brake member 60 has been placed in the rotation permitted position.

Note that when the brake member 60 is in the rotation locked position, the lower end faces of the rotation restriction ribs 88 do not contact the bottom faces of the rotation restriction grooves 90. Moreover, the thickness of the seat ribs 92 is set greater than the thickness of the rotation restriction ribs 88. Rigidity is accordingly secured with respect to the biasing force of the compression coil spring 82 acting through the brake member 60 when the seat ribs 92 are in contact with the stopper faces 94A.

Moreover, the height (the position of the upper ends) of the rotation restriction ribs 88 and the seat ribs 92 is determined such that when the clutch member 84 moves upwards to place the brake member 60 in the rotation permitted position, the rotation restriction ribs 88 and the seat ribs 92 do not impinge on the projection tabs 80A that are inserted through the through holes 74 formed at the circular plate portion 62B of the brake member 60 (see FIG. 3).

When the recording tape cartridge 10 is not in use (when the brake member 60 is in the rotation locked position), the press operation face 86C is disposed at a position at substantially the same height as the tips of the teeth of the reel gear 42. In an operation in which the reel gear 42 enmeshes with the drive gear 108 of the drive device, the press operation face 86C is pressed by a release face 114A of the drive device, moving the clutch member 84 upwards.

Regarding the rotation shaft 100 of the drive device, the rotation shaft 100 of the drive device is provided with a rotation shaft 102, as illustrated in FIG. 2 to FIG. 4. An upper end of the rotation shaft 102 is integrally formed with a flange portion 102A. A threaded hole 102B that opens upwards and has a specific depth is formed at an axial center portion of the rotation shaft 102. A circular plate shaped rotation table 104 is fixed to the upper end of the rotation shaft 102 in a state supported by the flange portion 102A.

A ring shaped projection 106 projects out from an outer peripheral portion of an upper face of the rotation table 104. The upper face of the ring shaped projection 106 is formed with the drive gear 108 that is capable of enmeshing with the reel gear 42 of the recording tape cartridge 10. An axial center portion of the rotation table 104 is formed with a through hole 104A coaxially to the threaded hole 102B.

A ring shaped magnet 110 is affixed coaxially to the rotation table 104 at the radial direction inner side of the ring shaped projection 106 (drive gear 108). A through hole 110A is formed coaxially to the through hole 104A at an axial center portion of the magnet 110. The rotation shaft 100 is provided with an operation member 112 that is screwed into the threaded hole 102B through the through holes 110A, 104A.

The operation member 112 is preferably configured, for example, by a metal hexagon socket head bolt, and includes a head 114 and a screw portion 112A that screws into the threaded hole 102B. A flattened upper face of the head 114 (at the periphery of the hexagon socket) configures the release face 114A that contacts the press operation face 86C of the clutch member 84.

The release face 114A is finished with the same degree of flatness as the upper face of the magnet 110 or greater, and is configured such that the orientation of the clutch member 84 remains stable when in contact and moving upwards. Namely, tilting of the rising clutch member 84 with respect to the reel 30 axial direction is suppressed or prevented.

The projection height of the operation member 112 with respect to the press operation face 86C can be regulated by adjusting the depth to which the screw portion 112A is screwed into the threaded hole 102B. Accordingly, the release face 114A can be made to contact the press operation face 86C of the clutch member 84 with good precision even when there is some degree of dimensional errors when forming and assembling the respective members configuring, for example, the clutch member 84 and the rotation shaft 100.

Explanation follows regarding operation of the recording tape cartridge 10 configured as described above.

When the recording tape cartridge 10 is loaded into the drive device in the arrow A direction, the recording tape cartridge 10 is positioned in the horizontal direction and the vertical direction, and the rotation shaft 100 approaches (moves upwards) relative to the gear opening 20 and retains the reel 30. Namely, the rotation shaft 100 attracts and retains the reel plate 54 in a non-contact state with the magnet 110, and the drive gear 108 of the rotation shaft 100 enmeshes with the reel gear 42.

Then, accompanying enmeshing of the reel gear 42 with the drive gear 108, the release face 114A of the rotation shaft 100 (operation member 112) contacts the press operation face 86C of the clutch member 84, and the clutch member 84 is pressed upwards against the biasing force of the compression coil spring 82. The brake member 60 that is in contact with the clutch member 84 through the steel ball 58 is accordingly also moved upwards, thereby releasing enmeshing between the brake gear 66 and the engagement gear 44 (releasing the rotation locked state with respect to the reel 30).

Then, when the rotation shaft 100 moves upward relative to the storage tape cartridge 10, the reel 30 is lifted upward together with the clutch member 84 and the brake member 60 (without altering the relative positions therebetween) against the biasing force of the compression coil spring 82. Namely, the lower flange 38 is separated from the ring shaped rib 22, and the reel 30 is moved to the rotation permitted position that is a non-contact state with the inner face of the case 12 in which rotation is possible.

The pulling out member of the drive device engages with the engagement recess 28A, pulls the leader block 28 out from the case 12, and fits the leader block 28 into the reel hub of a take-up reel. The reel 30 (rotation shaft 100) and the take-up reel are rotated in synchronization with each other such that the recording tape T is taken up onto the reel hub of the take-up reel whilst being pulled out from the case 12.

The clutch member 84 that retains the brake member 60 in the rotation permitted position rotates as a unit with the reel 30. Accordingly, when the reel 30 is rotating, the sliding contact face 86A of the clutch member 84 and the sliding contact portion 58A of the steel ball 58 of the brake member 60 make sliding contact with each other. Namely, the sliding contact face 86A is in sliding contact with a metal component rather than a resin component. Wear of the sliding contact face 86A is accordingly reduced (the durability is improved), and abraded powder is suppressed or prevented from occurring.

The steel ball 58 is retained non-rotatably by the leading end portion 70A of the projection portion 70 of the brake member 60. Namely, the steel ball 58 is gripped and fixed in the housing portion 69 by the inclined wall 69A and the lip portion 71. Accordingly, when the steel ball 58 is in sliding contact with the sliding contact face 86A of the clutch member 84, the inner walls of the housing portion 69 are not worn down by the steel ball 58, and the steel ball 58 can be retained with good precision by the leading end portion 70A (housing portion 69) of the projection portion 70, regardless of the number of times the recording tape cartridge 10 is used.

When fitting the steel ball 58 into the housing portion 69, the lip portion 71 (leading end portion 70A of the projection portion 70) resiliently deforms toward the radial direction outer side of the lip portion 71 to override the steel ball 58. Since the projection portion 70 projects out in the reel 30 axial direction from the axial center portion of the lower face of the circular plate portion 62B, resilient deformation of the lip portion 71 toward the radial direction outer side is not hindered, and the lip portion 71 readily undergoes resilient deformation toward the radial direction outer side. The steel ball 58 can accordingly be easily installed to the housing portion 69. Since the lip portion 71 is not prone to damage or plastic deformation, the steel ball 58 can be retained in the leading end portion 70A (housing portion 69) of the projection portion 70 with good precision.

Moreover, the projection height H of the projection portion 70 from the lower face of the circular plate portion 62B is set either higher than, or the same as, the height Hd of the portion of the exposed of the steel ball 58 exposed from the leading end portion 70A of the projection portion 70 subtracted from the diameter D of the steel ball 58. Namely, the steel ball 58 does not project out toward the circular plate portion 62B. Accordingly, resilient deformation of the lip portion 71 (the leading end portion 70A of the projection portion 70) toward the radial direction outer side does not affect the base 62, maintaining a high degree of precision in the brake member 60.

Figure 8:
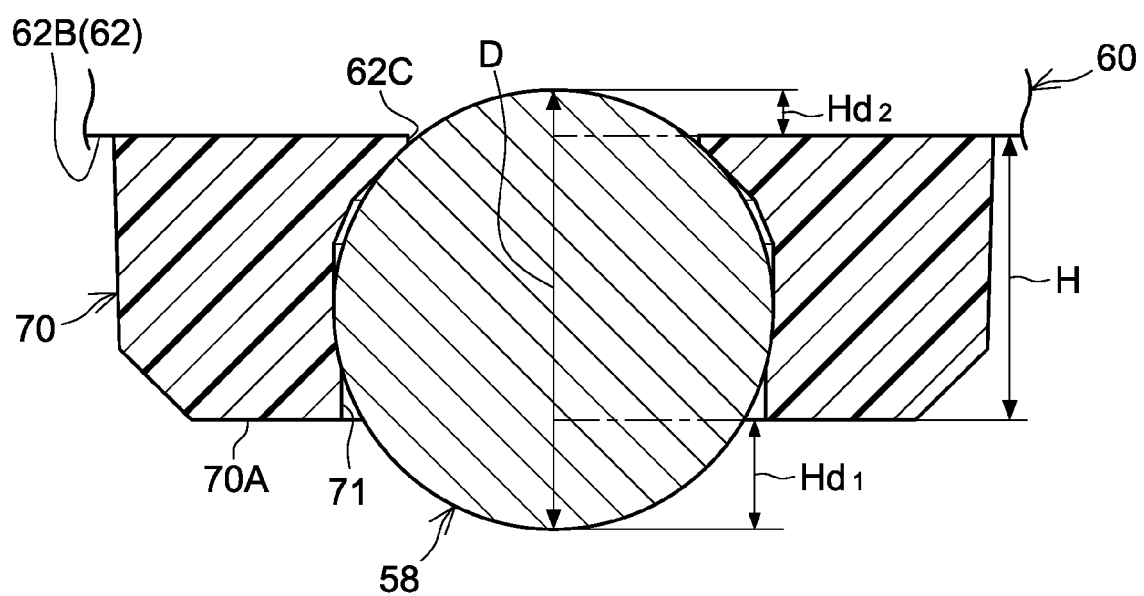
FIG. 8 is an enlarged cross-section illustrating a modified example of a projection portion of a brake member of a recording tape cartridge according to the present exemplary embodiment.

Note that as illustrated in FIG. 8, in a case in which the projection height H of the projection portion 70 is formed lower than the diameter D of the steel ball 58, a height Hd1 of one end portion of the steel ball 58 that is exposed from the leading end portion 70A of the projection portion 70 (opening end portion of the housing portion 69) is preferably set higher than a height Hd2 of the other end portion of the steel ball 58 that projects out from an opening 62C formed in the circular plate portion 62B on the opposite side to the leading end portion 70A (opening end portion). The steel ball 58 therefore does not come out of the projection portion 70 (brake member 60) even when force is applied to the steel ball 58 from the leading end portion 70A side (externally) in the reel 30 axial direction.

Figure 9:
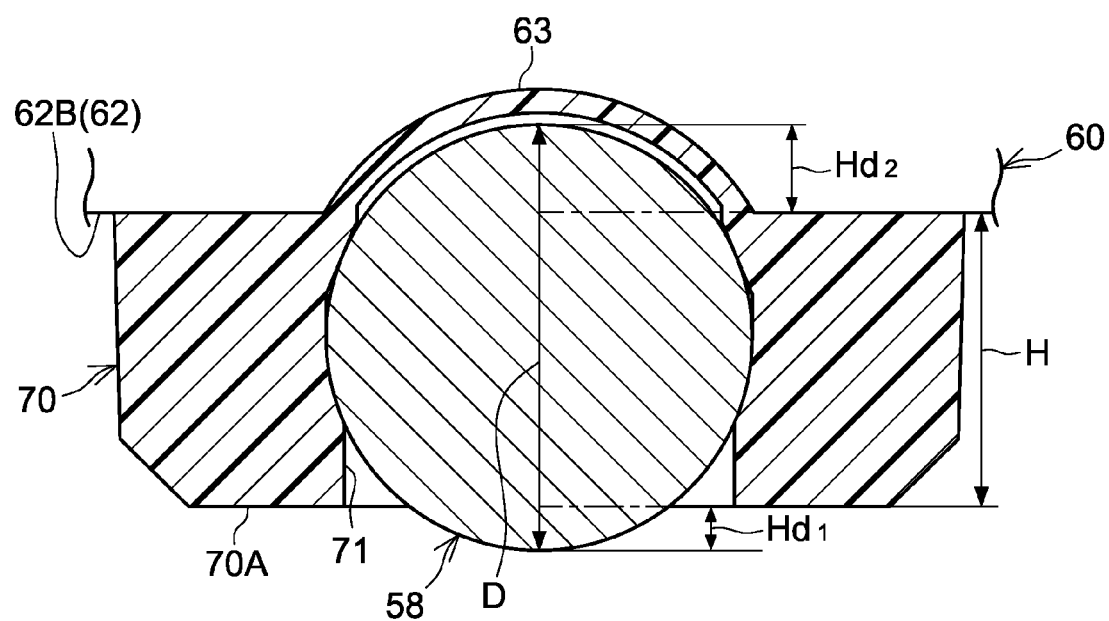
FIG. 9 is an enlarged cross-section illustrating a modified example of a projection portion of a brake member of a recording tape cartridge according to the present exemplary embodiment.

Moreover, as illustrated in FIG. 9, in a case in which the projection height H of the projection portion 70 is formed lower than the diameter D of the steel ball 58: the circular plate portion 62B is preferably formed with a cover 63 covering at least a portion of the other end portion of the steel ball 58 when the height Hd1 of the one end portion of the steel ball 58 that is exposed from the leading end portion 70A of the projection portion 70 (opening end portion of the housing portion 69) is formed lower than the height Hd2 of the other end portion of the steel ball 58 that projects out from the opening 62C formed in the circular plate portion 62B on the opposite side to the leading end portion 70A (opening end portion).

The cover 63 accordingly prevents the steel ball 58 from coming out of the projection portion 70 (brake member 60) even when force is applied to the steel ball 58 from the leading end portion 70A side (externally) in the reel 30 axial direction. Note that the cover 63 is specifically formed in a plan view cross shape covering the surface of the other end portion of the steel ball 58 (in a shape following the insertion slit 72A), however the cover 63 may also be formed in a substantially hemispherical shape covering the entire surface of the other end portion of the steel ball 58, in which case the opening 62C is not formed in the circular plate portion 62B.

Figure 10:
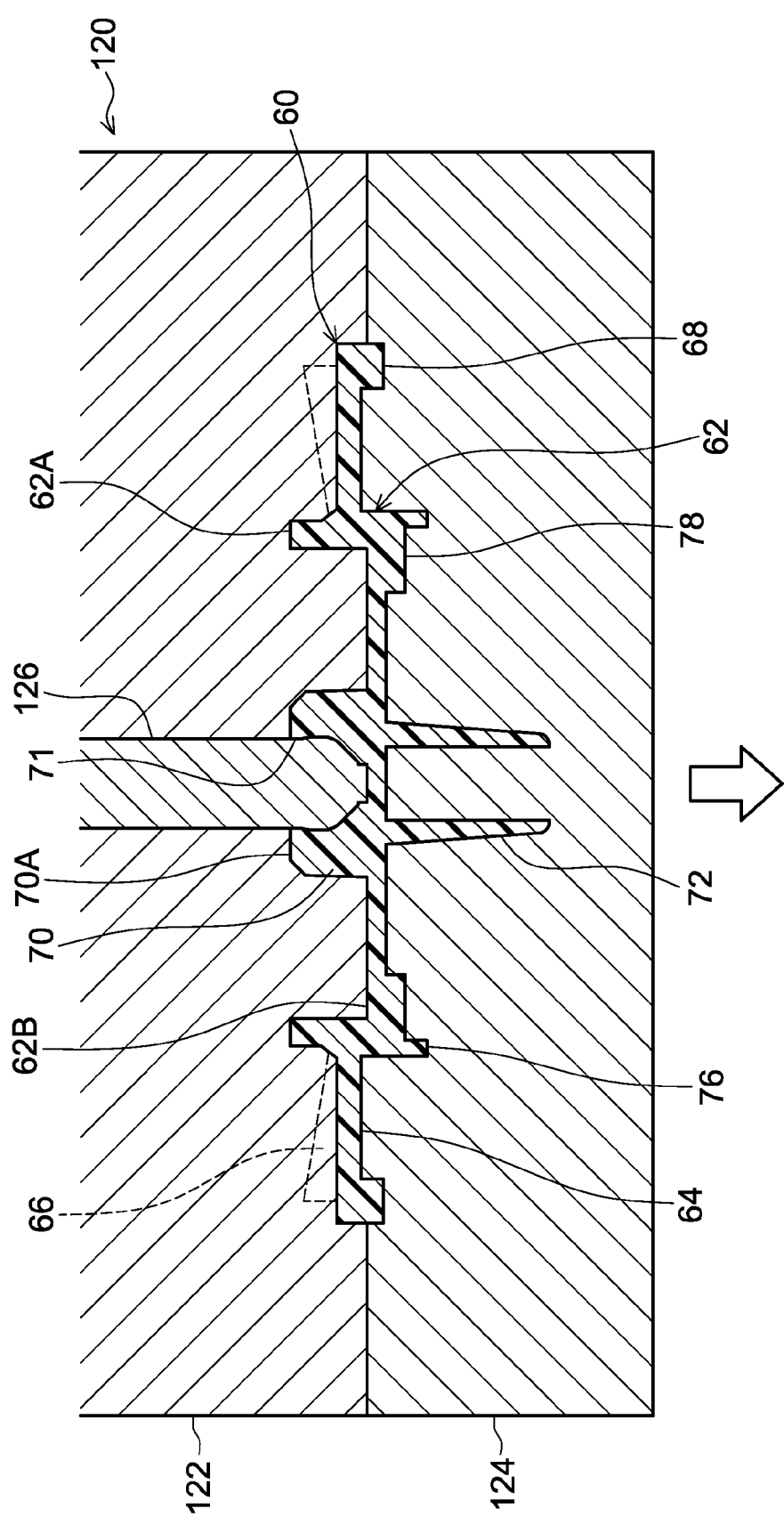
FIG. 10 is a cross-section illustrating a mold for molding a brake member of a recording tape cartridge according to the present exemplary embodiment.
Figure 11:
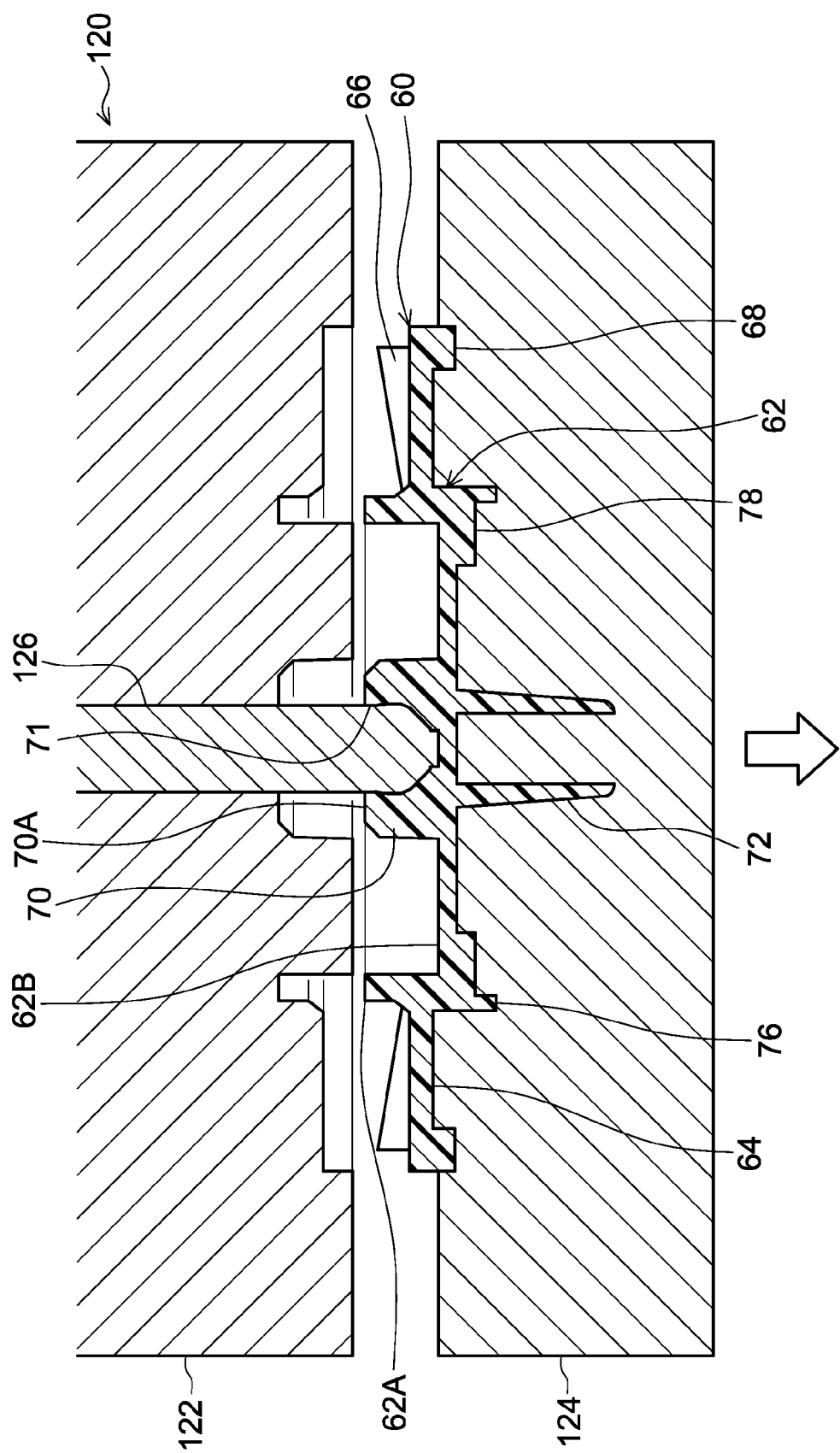
FIG. 11 is a cross-section to explain operation during removal of a brake member of a recording tape cartridge according to the present exemplary embodiment from a mold.

Lastly, explanation is given regarding a process (method) for molding the brake member 60. As illustrated in FIG. 10 to FIG. 12, a mold 120 is configured by a fixed mold 122 and a movable mold 124, and a moving mechanism, not illustrated in the drawings, that moves the movable mold 124 and the fixed mold 122 toward and away from one another.

The fixed mold 122 is provided with a core 126 that is capable of sliding toward the movable mold 124 side (the movable mold 124 moving away direction). The core 126 is configured so as to form the leading end portion 70A of the projection portion 70, namely the lip portion 71 that configures the undercut portion.

More specifically, as illustrated in FIG. 10, after a resin material (such as polyacetal) has been injected inside the mold 120 and the brake member 60 has been molded, the movable mold 124 that retains the brake member 60 is moved away from the fixed mold 122. When this is performed, as illustrated in FIG. 11 the core 126 slides toward the movable mold 124 side accompanying the movement of the movable mold 124.

Namely, since the core 126 is the portion that molds the lip portion 71 configuring the undercut portion, when the movable mold 124 is moved away from the fixed mold 122, the core 126 remains projecting out from the fixed mold 122, retained anchored to the lip portion 71.

The core 126 continues to project out until it is stopped by a stopper, not illustrated in the drawings, however the movable mold 124 continues to move even further away from the fixed mold 122 after the stopper has stopped the sliding of the core 126.

When this is performed, as illustrated in FIG. 12 the leading end portion 70A of the projection portion 70 where the lip portion 71 is formed undergoes resilient deformation toward the radial direction outer side (since there is nothing present at the leading end portion 70A radial direction outer side to impede resilient deformation) and separates from the core 126. The brake member 60 provided with the lip portion 71 serving as the undercut portion is thereby molded (removed from the mold) without difficulty.

The above explanation of the recording tape cartridge 10 according to the present exemplary embodiment has been given with reference to the drawings, however there is no limitation of the recording tape cartridge 10 according to the present exemplary embodiment to the configurations illustrated in the drawings, and the design may be varied as appropriate within a range not departing from the spirit of the present invention. For example, configuration may be made with the projection portion 70 provided projecting out from an axial center portion of the clutch main body 86 (sliding contact face 86A) of the clutch member 84 instead of from the brake member 60, with the steel ball 58 provided at the leading end portion 70A of the projection portion 70.

Note that the steel ball 58 need only be provided at one out of the brake member 60 or the clutch member 84. This is since the orientation of the brake member 60 with respect to the clutch member 84 becomes unstable when steel balls 58 are provided at both the brake member 60 and the clutch member 84. Moreover, it is preferable for the steel ball 58 (projection portion 70) to be provided at the brake member 60 so as to be incapable of rotation with respect to the case 12, since such a configuration enables a greater contribution to be made toward increasing the rotation speed of the reel 30 than a configuration in which the steel ball 58 is provided at the clutch member 84 that rotates as a unit with the reel 30.

Moreover, out of the brake member 60 and the clutch member 84, the side that is not provided with the steel ball 58 is preferably molded using polyacetal (POM) from the perspectives of improved sliding contact characteristics and durability, as well as reducing manufacturing costs, however the side provided with the steel ball 58 is not limited to polyacetal (POM), and may be molded from another resin material such as a polyamide (PA).

Moreover, there is no limitation to forming the lip portion 71 that serves as the undercut portion around the entire circumference, and the lip portion 71 may, for example, be formed at three locations at even intervals around the circumference, provided that lip portion 71 can non-rotatably retain the steel ball 58 with the housing portion 69 (inclined wall 69A). The inner walls configuring the spaces S1, S2 of the housing portion 69 are not limited to the shape illustrated (the inclined wall 69A, the tapering wall 69B and the straight wall 69C), and may, for example, be formed with a spherical face (curved face) following the surface of the steel ball 58.

Moreover, the spherical member is not limited to the steel ball (stainless steel ball) 58, and may be configured from another material such as ceramic, or a low friction resin material, such as a polyamide (PA). When such a resin is employed, a solid lubricant such as graphite or molybdenum disulfide may be added, and a filler may also be added to increase anti-wear characteristics and mechanical strength.

A leader pin may be attached to the free end of the recording tape T as the leader member, and the case 12 may be configured including a covering member (for example a sliding door that moves along a straight line or in an arc) to open and close the opening 18. The recording tape T is not limited to a magnetic tape, and may be any elongated tape shaped data recording and reproduction medium that is capable of storing data and that allows reproduction of the data stored thereon.

What is claimed is:
1. A recording tape cartridge comprising:
    a reel that is housed inside a case, and that is formed with an engagement portion on a bottom portion of a bottomed circular cylinder shaped reel hub onto which a recording tape is wound;

a resin brake member that is non-rotatably provided inside the case, that moves toward and away from the bottom portion of the reel hub, and that selectively adopts a rotation locked position where the brake member engages with the engagement portion, and a rotation permitted position where the engaged state with the engagement portion is released;

a resin release member that is provided at the bottom portion of the reel hub so as to be capable of movement in a reel axial direction and so as to rotate as a unit with the reel, and that is capable of moving the brake member to the rotation permitted position; and a projection portion that is provided projecting out in the reel axial direction from an axial center portion of either the brake member or the release member, that is formed with a housing portion housing a spherical member that contacts the other out of the brake member or the release member, and that is formed with a lip portion jutting out from an opening end portion of the housing portion toward a reel radial direction inner side so as to retain the spherical member housed in the housing portion, wherein a portion of the projection portion, at a side of the opening end portion of the housing portion, undergoes resilient deformation toward a reel radial direction outer side, such that the housing portion takes in the spherical member from the opening end portion of the housing portion.

2. The recording tape cartridge of claim 1, wherein:
the housing portion includes an inner wall that increases in internal dimension on progression toward an opening end portion side of the housing portion; and
the spherical member is housed by the inner wall and the lip portion.

3. The recording tape cartridge of either claim 1, wherein:
a projection height of the projection portion is higher than, or the same as, a height of the portion of the spherical member that is exposed from the opening end portion of the housing portion subtracted from the diameter of the spherical member.

4. The recording tape cartridge of either claim 1, wherein:
a projection height of the projection portion is lower than the diameter of the spherical member; and
a height of one end portion of the spherical member that is exposed from the opening end portion of the housing portion is higher than a height of another end portion of the spherical member that projects out from an opening formed on the opposite side of the housing portion to the opening end portion.

5. The recording tape cartridge of either claim 1, wherein:
a projection height of the projection portion is lower than the diameter of the spherical member; and
a height of one end portion of the spherical member that is exposed from the opening end portion of the housing portion is lower than a height of another end portion of the spherical member that projects out from an opening formed on the opposite side of the housing portion to the opening end portion, and a cover that covers at least a portion of the other end portion of the spherical member is formed at the opposite side to the opening end portion.

6. The recording tape cartridge of claim 1, wherein the projection portion is provided projecting from the brake member.

7. The recording tape cartridge of claim 6, wherein the projection portion is provided projecting from a circular plate portion that is formed at the brake member so as to extend in the reel radial direction.

8. A brake member for providing to a recording tape cartridge, the brake member comprising:
a circular plate portion that extends in a radial direction of a reel;
a projection portion that is provided projecting in a reel axial direction from an axial center portion of the circular plate portion;
a spherical member that is housed in a partially exposed state in a housing portion formed at the projection portion; and
a lip portion that is formed jutting out toward a reel radial direction inner side from an opening end portion of the housing portion of the projection portion, and that retains the spherical member housed in the housing portion,
wherein a portion of the projection portion, at a side of the opening end portion of the housing portion, undergoes resilient deformation toward a reel radial direction outer side, such that the housing portion takes in the spherical member from the opening end portion of the housing portion.

* * * * *